United States Patent
Chang

[11] Patent Number: 6,032,891
[45] Date of Patent: Mar. 7, 2000

[54] LENGTH COUNTING DEVICE FOR A FISHING REEL

[76] Inventor: Liang-Jen Chang, No. 132, Fuyi Rd., Taiping City, Taichung Hsien, Taiwan

[21] Appl. No.: 09/087,667

[22] Filed: May 29, 1998

[51] Int. Cl.⁷ ................................................. A01K 89/00
[52] U.S. Cl. .......................................... 242/223; 242/323
[58] Field of Search .................................. 242/223, 305, 242/323; 33/708, 715, 716, 719, 763

[56] References Cited

U.S. PATENT DOCUMENTS

| | | | |
|---|---|---|---|
| 2,637,112 | 5/1953 | Fontaine et al. | 242/323 X |
| 3,136,066 | 6/1964 | Spinn | 242/223 X |
| 4,697,758 | 10/1987 | Hirose et al. | 242/223 |
| 5,236,147 | 8/1993 | Kaneko | 242/223 |
| 5,363,565 | 11/1994 | Kaneko | 242/223 X |
| 5,395,065 | 3/1995 | Hirose | 242/223 |
| 5,427,323 | 6/1995 | Kaneko et al. | 242/223 |
| 5,503,341 | 4/1996 | Kaneko et al. | 242/223 |
| 5,883,154 | 11/1998 | Kaneko | 242/223 |

FOREIGN PATENT DOCUMENTS

| | | | |
|---|---|---|---|
| 404084842 | 3/1992 | Japan | 242/305 |
| 405023083 | 2/1993 | Japan | 242/305 |
| 405316906 | 12/1993 | Japan | 242/305 |
| 406133675 | 5/1994 | Japan | 242/305 |

*Primary Examiner*—Donald P. Walsh
*Assistant Examiner*—Emmanuel M. Marcelo
*Attorney, Agent, or Firm*—Heller Ehrman White & McAuliffe

[57] ABSTRACT

A length counting device is provided for a fishing reel which includes a fishing rod, a spool having a first rotary disk and a second rotary disk, and a fishing line wound around the spool. The counting device includes a supporting bracket mounted on the fishing rod and having a pivot ear. A teaching counting roller is rotatably mounted on the pivot ear and includes an outer periphery defining an annular guiding groove through which the fishing line is reeved. A first magnet is mounted on the outer periphery of the teaching counting roller to rotate therewith. A first magnetic sensor is mounted on the supporting bracket, wherein the first magnet can be rotated by the teaching counting roller to align with the first magnetic sensor. A counter is mounted on the fishing reel and includes a sensing circuit having a second magnetic sensor and a third magnetic sensor each located adjacent to the first rotary disk of the spool. A second magnet is fixedly mounted on the first rotary disk of the spool to rotate therewith to alternatively align with the first magnetic sensor and the second magnetic sensor.

18 Claims, 6 Drawing Sheets

LENGTH COUNTING DEVICE FOR A FISHING REEL

FIELD OF THE INVENTION

The present invention relates to a length counting device, and more particularly to a length counting device for a fishing reel.

BACKGROUND OF THE INVENTION

Usually, a plurality of fishing rods each can be used in the sea fishing. In such a situation, the fishing lines drawn outwardly from each the fishing rods have to be spaced apart from each other a determined length such that they will not tangle with each other. Therefore, it is necessary to calculate the length of each of the fishing lines so as to appropriately space them apart from each other. However, the conventional method for calculating the length of the fishing line is performed by manual measurement by the user, thereby easily causing an error in measuring the length of the fishing line.

The present invention has arisen to mitigate and/or obviate the disadvantage of the conventional method for calculating the length of the fishing line.

SUMMARY OF THE INVENTION

In accordance with one aspect of the present invention, there is provided a length counting device for a fishing reel comprising a fishing rod and a fishing line. The counting device comprises a supporting bracket fixedly mounted on the fishing rod and including a pivot ear extending outwardly from a mediate portion thereof. A roller is rotatably mounted on the pivot ear and includes an outer periphery defining an annular guiding groove through which the fishing line is reeved. A magnet is fixedly mounted on the outer periphery of the roller to rotate therewith, and a magnetic sensor is fixedly mounted on the mediate portion of the supporting bracket and is located adjacent to the outer periphery of the roller, wherein the magnet can be rotated by the roller to align with the sensor.

In accordance with another aspect of the present invention, there is provided a length counting device for a fishing reel comprising a fishing rod fixedly mounted thereon, a spool rotatably mounted therein and including a first rotary disk and a second rotary disk, and a fishing line wound around the spool.

The counting device comprises a supporting bracket fixedly mounted on the fishing rod and including a pivot ear extending outwardly from a mediate portion thereof. A teaching counting roller is rotatably mounted on the pivot ear and includes an outer periphery defining an annular guiding groove through which the fishing line is reeved.

A first magnet is fixedly mounted on the outer periphery of the teaching counting roller to rotate therewith, and a first magnetic sensor fixedly mounted on the mediate portion of the supporting bracket and is located adjacent to the outer periphery of the teaching counting roller, wherein the first magnet can be rotated by the teaching counting roller to align with the first magnetic sensor.

A counter is fixedly mounted on the fishing reel and comprises a sensing circuit including a second magnetic sensor and a third magnetic sensor each located adjacent to an outer periphery of the first rotary disk of the spool, and a second magnet fixedly mounted on the outer periphery of the first rotary disk of the spool to rotate therewith to alternatively align with the first magnetic sensor and the second magnetic sensor.

Further features of the present invention will become apparent after a careful reading of the detailed description with appropriate reference to the accompanying drawings.

DETAILED DESCRIPTION OF THE PREFERRED EMBODIMENTS

Figure 1:
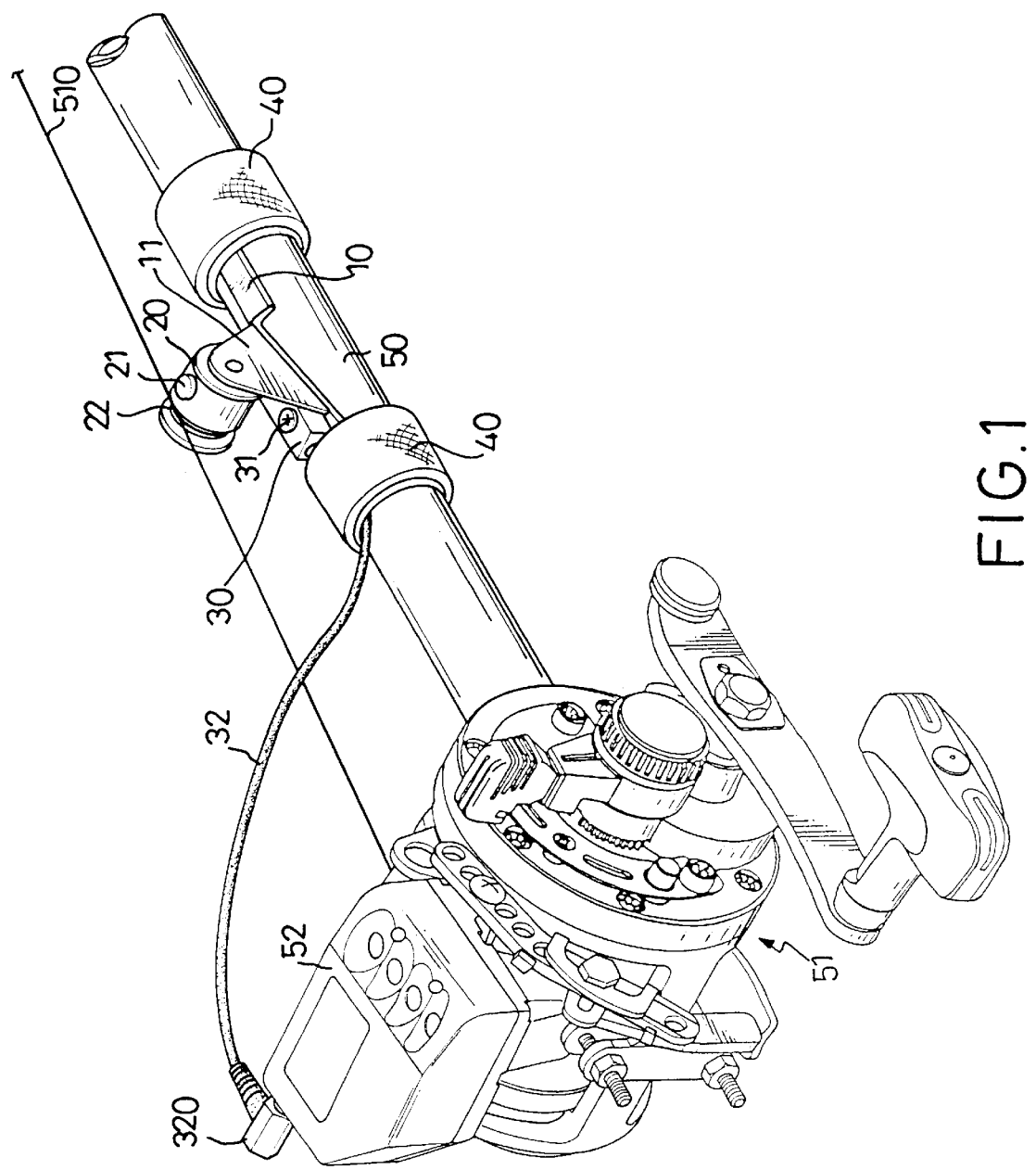
FIG. 1 is a perspective view of a length counting device for a fishing reel in accordance with a first embodiment of the present invention.
Figure 2:
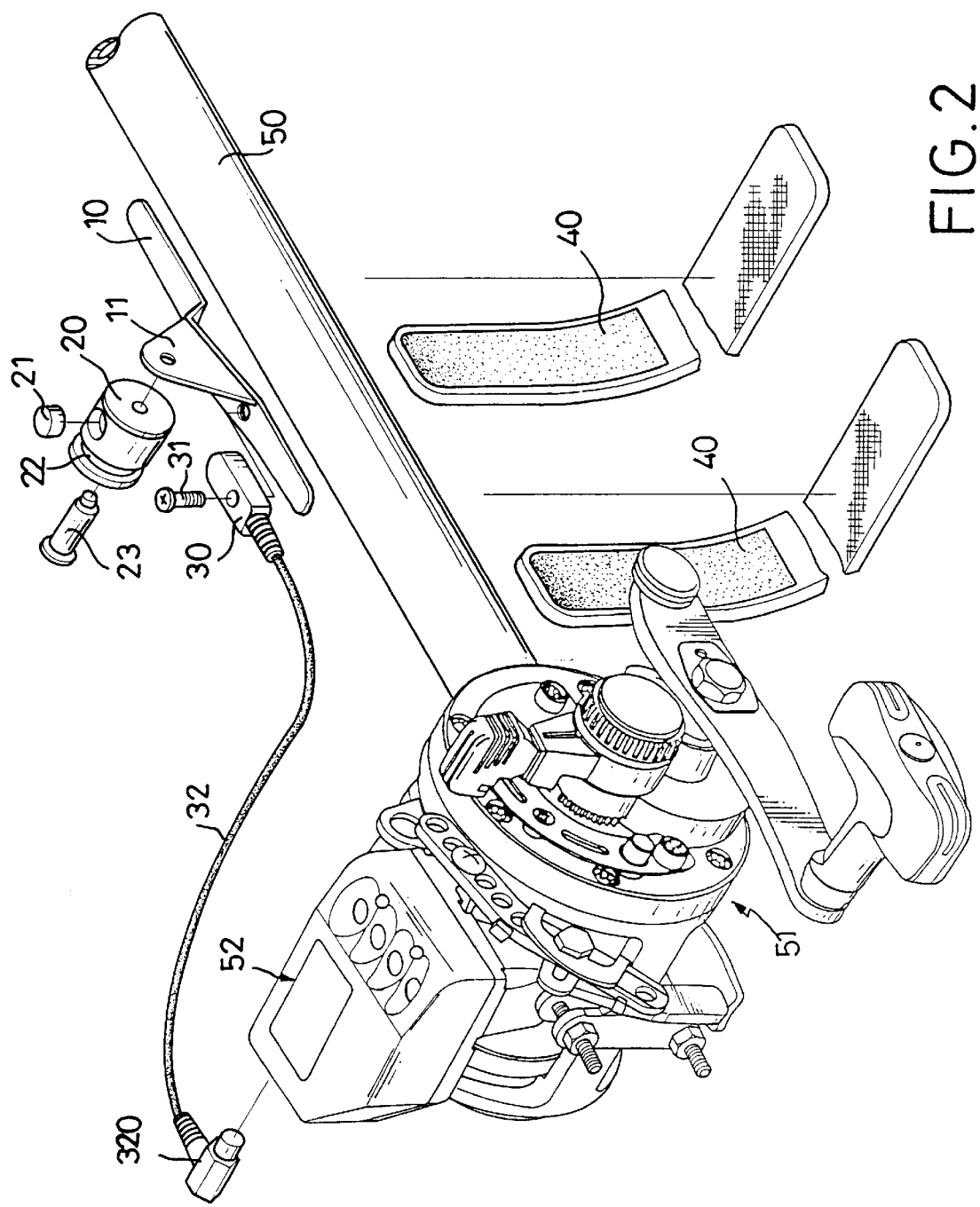
FIG. 2 is an exploded view of the counting device as shown in FIG. 1.
Figure 3:
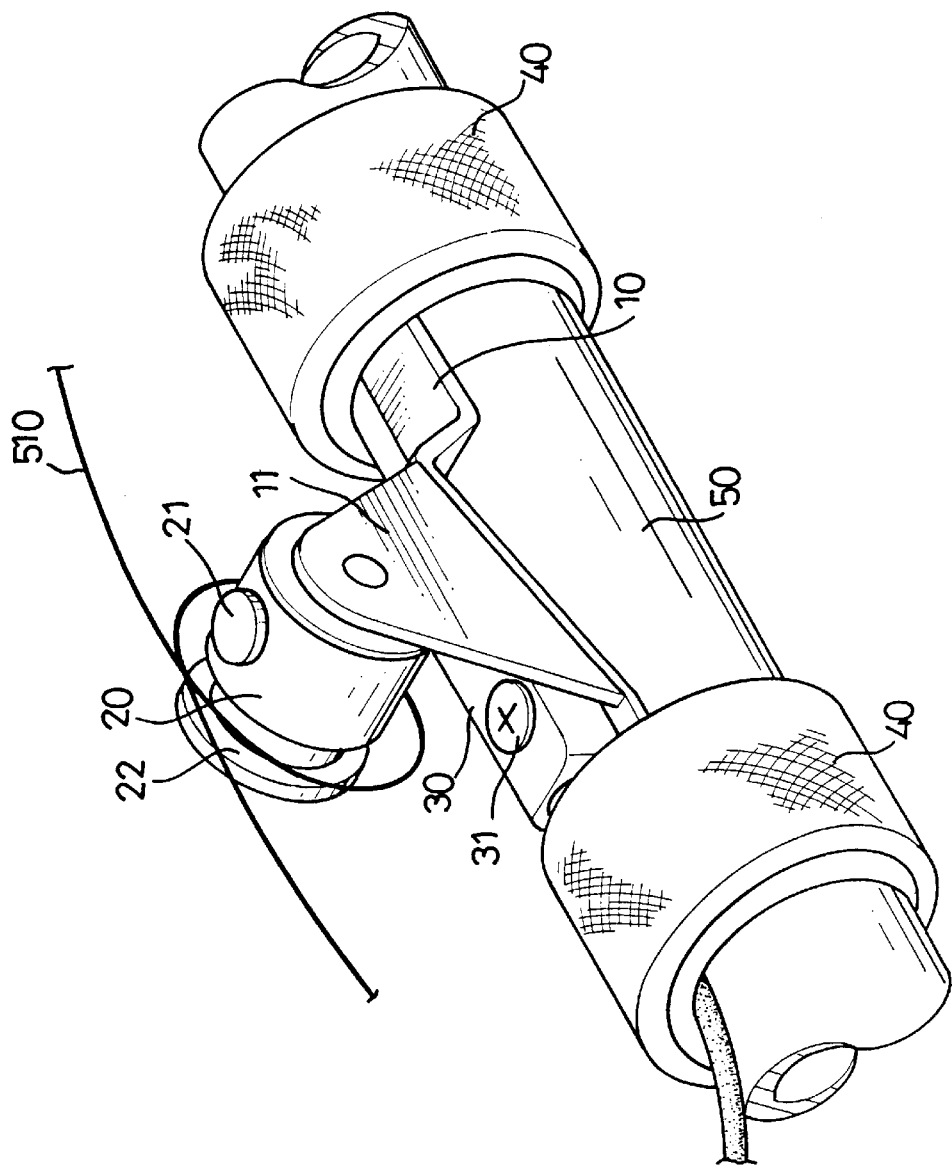
FIG. 3 is a partially cut-away view of the counting device as shown in FIG. 1 on an enlarged scale.

Referring to the drawings, and initially to FIGS. 1–3, a length counting device in accordance with a first embodiment of the present invention can be adapted to measure the length of a fishing line 510 to be drawn outwardly from a fishing reel 51 which can be used in deep sea fishing.

The counting device comprises a supporting bracket 10 fixedly mounted on a fishing rod 50 of the fishing reel 51 by means of two resilient sleeves 40 and including a pivot ear 11 extending outwardly from a mediate portion thereof. A roller 20 is rotatably mounted on the pivot ear 11 by means of a pivot axle 23 and including an outer periphery defining an annular guiding groove 22 through which the fishing line 510 is reeved. A magnet 21 is fixedly mounted on the outer periphery of the roller 20 to rotate therewith.

A magnetic sensor 30 is fixedly mounted on the mediate portion of the supporting bracket 10 by means of a positioning screw 31 and is located adjacent to the outer periphery of the roller 20. A counter 52 is mounted on the fishing reel 51, and a connecting line 32 includes a first terminal connected to the sensor 30 and a second terminal 320 connected to the counter 52.

In operation, the fishing line 510 is initially wound around the fishing reel 51 and includes one distal end reeved through the guiding groove 22 of the roller 20 as shown in FIG. 1.

When the fishing line 510 is drawn outwardly, the roller 20 together with the magnet 21 are rotated via a drawing force exerted by the fishing line 510 on the roller 20.

The magnetic sensor 30 can be used to detect the passage of the magnet 21 when the magnet 21 is rotated to align with the magnetic sensor 30 and can then input a signal via the connecting line 32 into the counter 52 which can be used to count the times of passage of the magnet 21 through the magnetic sensor 30 such that the outwardly drawn length of the fishing line 510 from the fishing reel 51 can be precisely determined by multiplying the circumferential length of the guiding groove 22 by the times of passage of the magnet 21 detected by the magnetic sensor 30.

Figure 4:
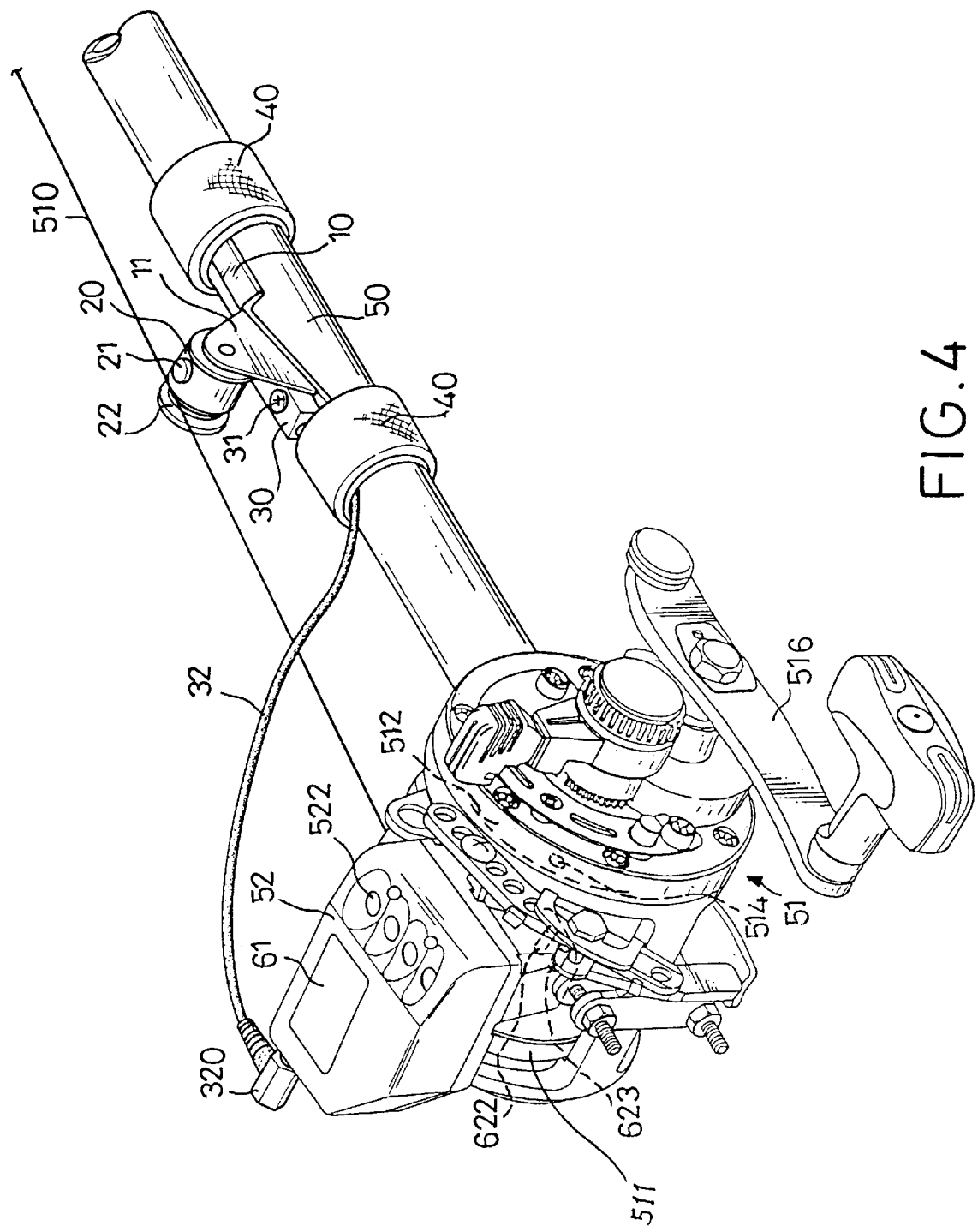
FIG. 4 is a perspective view of a length counting device for a fishing reel in accordance with a second embodiment of the present invention.
Figure 5:
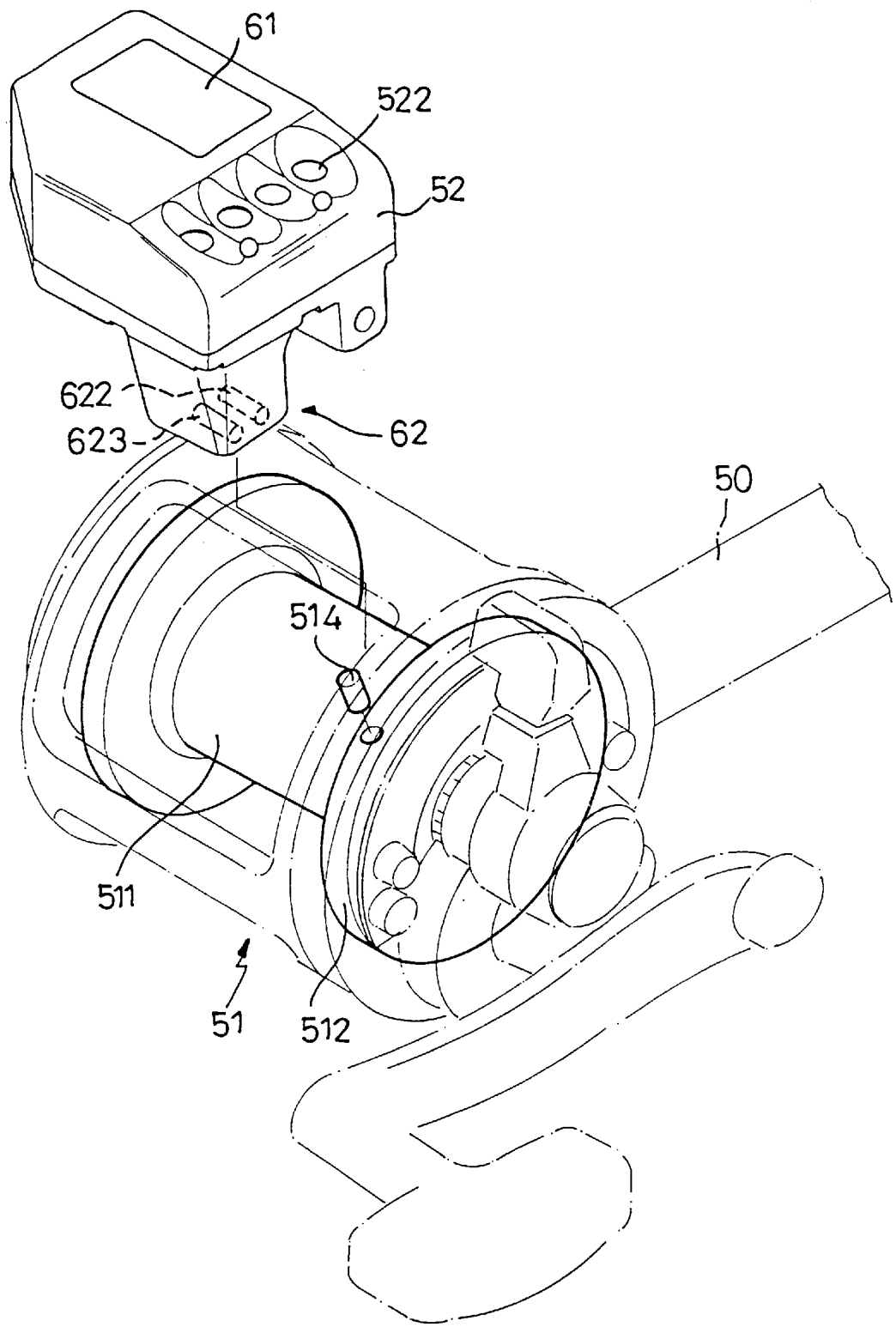
FIG. 5 is a partially exploded view of the counting device as shown in FIG. 4.
Figure 6:
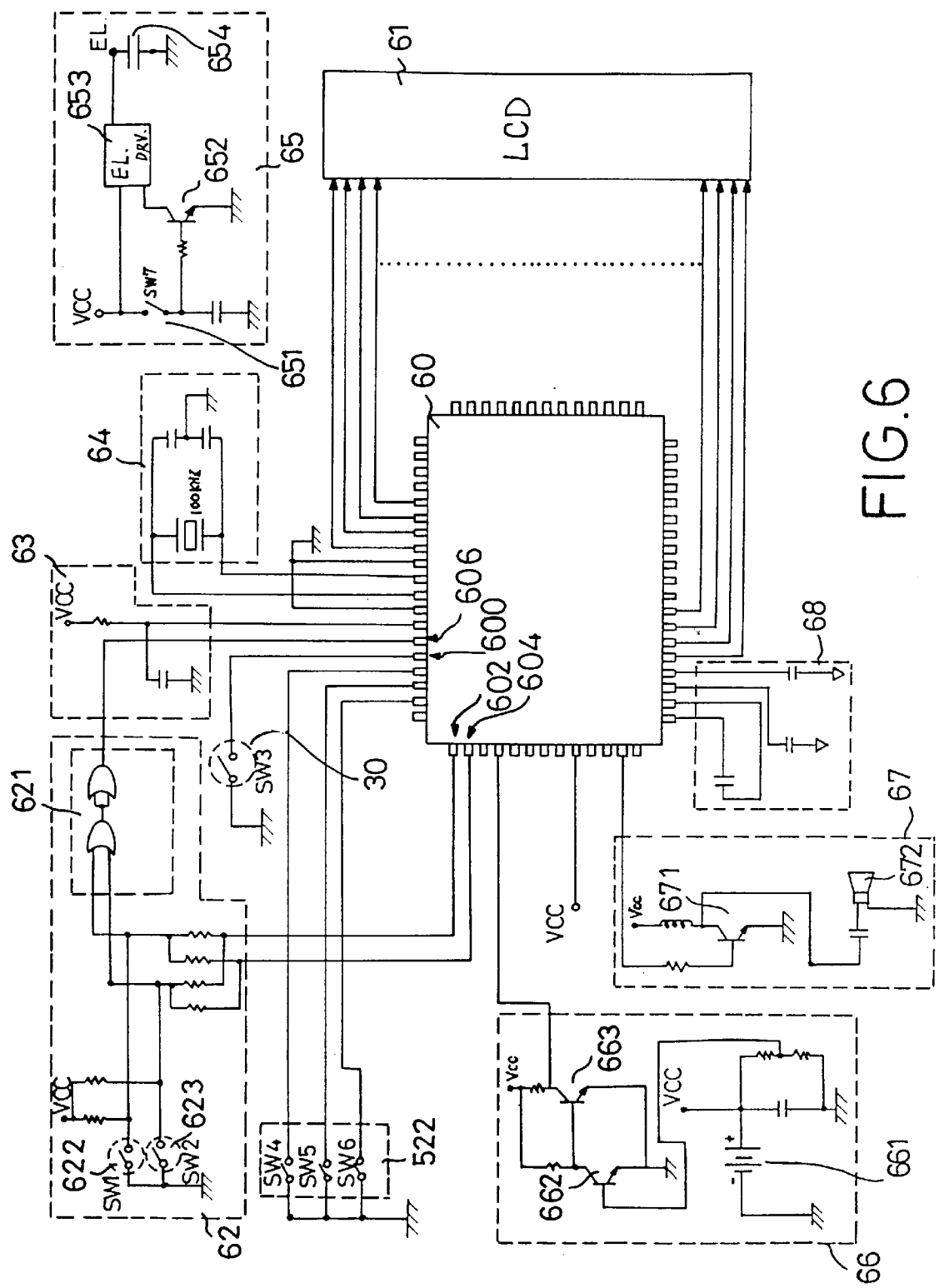
FIG. 6 is a circuit diagram of the counting device as shown in FIG. 4.

Referring now to FIGS. 4–6, a length counting device in accordance with a second embodiment of the present invention can be adapted to measure the length of a fishing line 510 to be drawn outwardly from a fishing reel 51 which can be used in deep sea fishing.

The fishing reel 51 comprises a fishing rod 50 fixedly mounted thereon, a spool 511 rotatably mounted therein and including a first rotary disk 512 and a second rotary disk, and a fishing line 5 10 wound around the spool 511.

The counting device comprises a supporting bracket 10 fixedly mounted on the fishing rod 50 by means of two resilient sleeves 40 and including a pivot ear 11 extending outwardly from a mediate portion thereof. A teaching counting roller 20 is rotatably mounted on the pivot ear 11 and includes an outer periphery defining an annular guiding groove 22 through which the fishing line 510 is reeved. A first magnet 21 is fixedly mounted on the outer periphery of the teaching counting roller 20 to rotate therewith. A first magnetic sensor 30 such as a reed switch is fixedly mounted on the mediate portion of the supporting bracket 10 by means of a positioning screw 31 and is located adjacent to the outer periphery of the teaching counting roller 20, wherein the first magnet 21 can be rotated by the teaching counting roller 20 to align with the first magnetic sensor 30.

A counter 52 is fixedly mounted on the fishing reel 51 and comprises a sensing circuit 62 including a second magnetic sensor 622 such as a reed switch and a third magnetic sensor 623 such as a reed switch juxtaposed with each other and each located adjacent to an outer periphery of the first rotary disk 512 of the spool 511. The sensing circuit 62 also includes a buffer 621 composed of two logical gates. A second magnet 514 is fixedly mounted on the outer periphery of the first rotary disk 512 of the spool 511 to rotate therewith to alternatively align with the first magnetic sensor 622 and the second magnetic sensor 623.

The counter 52 further comprises a microprocessor 60 including a first inlet 600 connected to an outlet of the first magnetic sensor 30, a second inlet 602 connected to an outlet of the second magnetic sensor 622, a third inlet 604 connected to an outlet of the third magnetic sensor 623, and a fourth inlet 606 connected to the buffer 621.

A connecting line 32 includes a first terminal connected to the outlet of the first magnetic sensor 30 and a second terminal 320 connected to the first inlet 600 of the microprocessor 60.

A display 61 such as a liquid crystal display is connected to the microprocessor 60 which is also connected to a plurality of teaching key switches 522, a reset circuit 63, an oscillating circuit 64, an electroluminescent actuating circuit 65, a cell voltage detecting circuit 66, an amplifying circuit 67, and a biasing circuit 68.

The electroluminescent actuating circuit 65 comprises a switch 651, a transistor 652, an electroluminescent drive 653, and a electroluminescent panel 654. The cell voltage detecting circuit 66 comprises a cell 661 and two transistors 662 and 663. The amplifying circuit 67 comprises a transistor 671 and a horn 672.

In operation, referring to FIGS. 4 and 5 to reference to FIG. 6, the fishing line 510 is initially reeved through the guiding groove 22 with its one distal end wound around the spool 511 as shown in FIG. 4.

The counter 52 can be placed in a teaching mode by means of pressing one of the key switches 522. When the teaching mode of the counter 52 is initiated, the spool 511 can then be rotated by means of a crank handle 516 of the fishing reel 51, thereby in turn winding the fishing line 510 around the spool 511 continuously and evenly. The teaching roller 20 can also be rotated by means of a drawing action of the fishing line 510 during the rotation of the spool 511.

In such a situation, when the spool 511 is rotated through a circle, the teaching roller 20 can be rotated through a number of circles. The first magnet 21 can be rotated with the teaching roller 20 to align with the first magnetic sensor 30 which can be adapted to input a signal into the microprocessor 60 such that the number of rotation of the teaching roller 20 can be calculated and stored in the microprocessor 60, while the second magnet 514 can be rotated with the spool 511 to align with the second magnetic sensor 622 or the third sensor 623 which can be adapted to input a signal into the microprocessor 60 such that the number of rotation of the spool 511 can be calculated and stored in the microprocessor 60. In such a manner, the number of rotation of the teaching roller 20 corresponding to that of the spool 511 can be determined and stored in the microprocessor 60.

When the teaching roller 20 is rotated through a circle, the length of the fishing line 510 reeved through the teaching roller 20 is equal to the circumferential length of the guiding groove 22 such that the length of the fishing line 510 wound around the spool 511 during the spool 511 being rotated through a circle can be determined by means of multiplying the corresponding number of circle of the teaching roller 20 by the circumferential length of the guiding groove 22.

When the entire length of the fishing line 510 is wound around the spool 511, one of the key switches 522 can be pressed, thereby finishing the teaching mode of the counter 52. By such an arrangement, the microprocessor 60 can be used to calculate and store numerous data which represent the length of the fishing line 510 corresponding to different circles of rotation of the spool 511.

The teaching roller 20 together with the supporting bracket 10 can then be removed from the fishing rod 50.

Now, the fishing line 510 wound around the spool 511 can be continuously drawn outwardly therefrom to be immersed into the sea. The second magnetic sensor 622 can be used to detect the passage of the second magnet 514 such that the number of rotation of the spool 511 can be calculated by means of the microprocessor 60 which in turn determines the outwardly drawn length of the fishing line 510 corresponding to the different circles of rotation of the spool 511 depending on the numerous data stored therein.

On the contrary, the fishing line 510 can be continuously drawn inwardly to be wound around the spool 511 by means of rotating the crank handle 516 when the fishing procedure is finished. The third magnetic sensor 623 can be used to detect the passage of the second magnet 514 such that the number of rotations of the spool 511 can be calculated by means of the microprocessor 60 which in turn determines the inwardly drawn length of the fishing line 510 corresponding to the different circles of rotation of the spool 511 depending on the numerous data stored therein.

It should be clear to those skilled in the art that further embodiments may be made without departing from the scope and spirit of the present invention.

What is claimed is:

1. A length counting device in combination with a fishing reel (51) comprising a fishing rod (50) and a fishing line (510), said counting device comprising:

a supporting bracket (10) fixedly mounted on said fishing rod (50) and including a pivot ear (11) extending outwardly from a mediate portion thereof;

a roller (20) rotatably mounted on said pivot ear (11) and including an outer periphery defining an annular guiding groove (22) through which said fishing line (510) is reeved;

a magnet (21) fixedly mounted on said outer periphery of said roller (20) to rotate therewith; and a magnetic sensor (30) fixedly mounted on said mediate portion of said supporting bracket (10) and located adjacent to said outer periphery of said roller (20);

wherein said magnet (21) is rotated by said roller (20) to align with said sensor (30).

2. The length counting device according to claim 1, further comprising a counter (52) mounted on said fishing reel (51), and a connecting line (32) including a first terminal connected to said sensor (30) and a second terminal (320) connected to said counter (52).

3. The length counting device according to claim 1, further comprising a resilient sleeve (40) mounted around said fishing rod (50) for securely fastening said supporting bracket (10) on said fishing rod (50).

4. A length counting device in combination with a fishing reel (51) comprising a fishing rod (50) fixedly mounted thereon, a spool (511) rotatably mounted therein and including a first rotary disk (512) and a second rotary disk, and a fishing line (510) wound around said spool (511), said counting device comprising:

a supporting bracket (10) fixedly mounted on said fishing rod (50) and including a pivot ear (11) extending outwardly from a mediate portion thereof;

a teaching counting roller (20) rotatably mounted on said pivot ear (11) and including an outer periphery defining an annular guiding groove (22) through which said fishing line (510) is reeved;

a first magnet (21) fixedly mounted on said outer periphery of said teaching counting roller (20) to rotate therewith;

a first magnetic sensor (30) fixedly mounted on said mediate portion of said supporting bracket (10) and located adjacent to said outer periphery of said teaching counting roller (20), wherein said first magnet (21) is rotated by said teaching counting roller (20) to align with said first magnetic sensor (30);

a counter (52) fixedly mounted on said fishing reel (51) and comprising a sensing circuit (62) including a second magnetic sensor (622) and a third magnetic sensor (623) each located adjacent to an outer periphery of said first rotary disk (512) of said spool (511); and a second magnet (514) fixedly mounted on said outer periphery of said first rotary disk (512) of said spool (511) to rotate therewith to alternatively align with said first magnetic sensor (622) and said second magnetic sensor (623).

5. The length counting device according to claim 4, wherein said counter (52) further comprises a microprocessor (60) including a first inlet (600) connected to an outlet of said first magnetic sensor (30), a second inlet (602) connected to an outlet of said second magnetic sensor (622), and a third inlet (604) connected to an outlet of said third magnetic sensor (623).

6. The length counting device according to claim 5, further comprising a connecting line (32) including a first terminal connected to said outlet of said first magnetic sensor (30) and a second terminal (320) connected to said first inlet (600) of said microprocessor (60).

7. The length counting device according to claim 5, wherein said counter (52) further comprises a display (61) connected to said microprocessor (60).

8. The length counting device according to claim 7, wherein said display (61) is a liquid crystal display or other flat screen display.

9. The length counting device according to claim 5, wherein said counter (52) further comprises a reset circuit (63) connected to said microprocessor (60).

10. The length counting device according to claim 5, wherein said counter (52) further comprises an oscillating circuit (64) connected to said microprocessor (60).

11. The length counting device according to claim 5, wherein said counter (52) further comprises an electroluminescent actuating circuit (65) connected to said microprocessor (60).

12. The length counting device according to claim 5, wherein said counter (52) further comprises a cell voltage detecting circuit (66) connected to said microprocessor (60).

13. The length counting device according to claim 5, wherein said counter (52) further comprises an amplifying circuit (67) connected to said microprocessor (60).

14. The length counting device according to claim 5, wherein said counter (52) further comprises a biasing circuit (68) connected to said microprocessor (60).

15. The length counting device according to claim 4, further comprising a resilient sleeve (40) mounted around said fishing rod (50) for securely fastening said supporting bracket (10) on said fishing rod (50).

16. The length counting device according to claim 4, wherein said first magnetic sensor (30) is a reed switch.

17. The length counting device according to claim 4, wherein said second magnetic sensor (622) is a reed switch.

18. The length counting device according to claim 4, wherein said third magnetic sensor (623) is a reed switch.

* * * * *